INVENTORS
HEARD K. BAUMEISTER
ANTHONY W. ORLANDO
WILLIAM B. PHILLIPS
BY Bernard M. Goldman
ATTORNEY April 18, 1967 H. K. BAUMEISTER ET AL 3,314,729

PNEUMATIC BELT DEVICE UTILIZING BACK-PULSING OR FORWARD-PULSING

Filed April 27, 1964

11 Sheets-Sheet 2

April 18, 1967 H. K. BAUMEISTER ET AL 3,314,729

PNEUMATIC BELT DEVICE UTILIZING BACK-PULSING OR FORWARD-PULSING

Filed April 27, 1964 11 Sheets-Sheet 3

United States Patent Office 3,314,729
Patented Apr. 18, 1967

3,314,729

PNEUMATIC BELT DEVICE UTILIZING BACK-PULSING OR FORWARD-PULSING

Heard K. Baumeister, Rhinebeck, and Anthony W. Orlando, Highland, N.Y., and William B. Phillips, West Lafayette, Ind., assignors to International Business Machines Corporation, New York, N.Y., a corporation of New York Filed Apr. 27, 1964, Ser. No. 362,666
15 Claims. (Cl. 302—2)

This invention relates to an improvement in the belt transfer control of a system for storing information on the magnetic surface of a flexible belt which can be quickly accessed from a storage pocket for a data processing operation. This invention is an improvement on a basic Pneumatic Belt Device described and claimed in a U.S. patent application Ser. No. 333,918 filed Dec. 27, 1963 by P. J. Badum, H. K. Baumeister, and V. Nejezchleb, and assigned to the same assignee as the present application. Briefly, the pneumatic belt device relates to a system utilizing flexible information-storage belts, which can be stored and pneumatically transported to a processing chamber in a compact (small-volume) form. Upon entering the chamber, the belt is opened automatically from its small-volume form to an inflated form, which can cause it to automatically engage a driving means that maintains motion for the belt in the processing chamber. The motion of the belt in the chamber carries it by a read-write station, at which information is applied or received from the belt surface. By using high density magnetic recording and many recorded tracks per belt, a very large amount of information can be stored on a single belt.

It is, therefore, an object of this invention to improve the operation of a pneumatic device operating with flexible belts having large quantities of information stored thereon.

It is another object of this invention to improve the operation of a pneumatic device operating with flexible belts which can permit random accessing of any belt among a large number of belts within a relatively short period of time, such as 50 milliseconds, for example.

It is a further object of this invention to improve the operation of a pneumatic belt transporting arrangement which carefully handles each belt in a delicate manner so that it will not be damaged in being transported at very high velocities relative to stationary surfaces, for example in the range of 500 to 2000 inches per second.

It is another object of this invention to provide improved means for controlling the retrieval, replacement, and read-write movement of a belt in response to pneumatic operation without the intervention of parts having substantial mechanical inertia.

It is an object of the invention to insure the extended form of a belt in a pneumatic device at critical points of belt travel.

It is a further object of this invention to provide a system for pneumatically transporting a flexible belt and applying a back-pressure or forward-pressure pneumatic pulse to the trailing end or leading end, respectively, of the belt as it is about to move into a processing chamber, whereby the extended condition of the belt is improved at a critical point and assists in the reliability of belt inflation in the chamber.

It is another object of this invention to provide a system for pneumatically stopping a flexible belt as it enters its storage pocket by applying a back-pressure or a forward-pressure pneumatic pulse as it moves into its pocket.

A plurality of belts can be stored in a plurality of respective pockets. Pneumatic means is provided for quickly transporting any selected belt from an addressed pocket to a processing chamber on a random-accessed basis. The pneumatic transportation of the belts preferably does not involve any intervening mechanical element, with only control valves being used. More than one processing chamber may be provided for processing plural belts simultaneously. The control valves are operated by this invention in a manner which obtains a required back-pressure or forward-pressure at a required time.

One or more pneumatic headers (transport tube) of rectangular cross-section connect one or more processing chambers to one or more storage pockets. The rectangular cross-section of the header complies with the compact form of the belt while it is being transported. This compact form of the belt involves maintaining substantially parallel sides of the belt during its transport, as was provided during pocket storage. The transportable form of the belt traps a volume of air within the belt between the belt sides along the header as it is being transported. Accordingly, the clearance between the edges of the belt and the sides of the header must be maintained small so that air leakage around the edges of the belt during its transport is reduced below a minimum which would cause the opposite sides of the belt to touch before an end of a transportation cycle. During transport, a pressure differential exists between the opposite ends of the belt to maintain the extended form of the belt as it moves along the header. The small tolerance permitted between the edges of the belt and the header should provide sufficient resistance to the leakage of air from within the belt so that the air pressure within the belt is higher than the pressures at its opposite ends. This higher internal pressure prevents belt collapse during its transport. Collapse of the belt may result in wrinkling the belt, which can destroy information on the belt by putting creases in its magnetic surface. When recorded bit densities of the order of 4,000 bits per inch are used, even slight creases in the magnetic surface can eradicate a large number of data bits.

During transport, the belts can move around corners, preferably rounded, while maintaining the uncollapsed relationship between opposite sides to maintain about the same volume of trapped air.

A storage pocket for each belt may be positioned along the header and openly connected to it. There may be a large number of storage pockets located along one or both sides of the header. Each storage pocket can store a single belt.

The information processing chamber is connected to an end of the header, and can comprise a plurality of columns adjacently connected in a star configuration. In such case, the header connection is between two of the vacuum columns; and a constantly rotating capstan can be positioned between two other of the columns.

An opening is provided in one or both side walls of the processing chamber adjacent to the header connection. When a belt is received into the chamber, air is permitted to flow under pressure through the openings to inflate the belt into conformity with the shape of the processing chamber. On the other hand, when the belt is being removed from the chamber to the header, this opening permits air to leave the center volume of the belt so that the belt can deflate to the compact parallel-sided form needed for transmission along the header.

Inflating the belt in the chamber can be further hastened by having another opening in one or both side walls of the header adjacent to the chamber and aligned between the sides of a passing belt. The header openings permit air to pass into the center of the belt as soon as an end of the belt is received in the chamber, while the back portion of the belt is still in the header and aligned with the openings in the header.

A sensor in the header (such as a photocell) can be located near the chamber to signal when inflating or deflating pneumatic pressure should be provided to the respective inflation-deflation openings in the chamber and header as the belt moves in or out of the chamber. When the belt actuates the photocell, the valves in the pockets are reverse-actuated to cause a back-pressure pneumatic pulse to be delivered to the belt. The back-pressure is applied to the trailing edge of the belt and assures that the belt remains extended when in alignment with the slots, through which air is being applied to inflate the belt into conformity with the chamber. The back-pressure pulse slows the belt while maintaining it extended, which makes the inflation operation more reliable.

When the belt moves into the chamber and inflates, its surface is automatically brought against a rotating capstan located along one wall of the chamber. The belt is held against the capstan by vacuum-pressure forces applied to the bottoms of columns on opposite sides of the capstan, thereby pulling the belt into frictional engagement with the capstan. Hence the belt is forced to move at the rate of the capstan surface.

A read-write transducer may be located along the side of the chamber adjacent the capstan to engage an outer recording surface on the belt.

In order to move the belt between its storage pocket and the chamber, a pneumatic valving arrangement is provided both for the chamber and for each pocket. The valving arrangement causes a pressure-drop differential from the pocket to the chamber, when it is necessary to move the belt from the respective pocket to the chamber. The pressure-drop differential is reversed by the valving arrangement to move the belt back to its assigned pocket. A sensor is provided to signal when a belt has been received by a pocket. The sensor stops the application of any high pressure to the chamber or slots and instead applies a low pressure to the chamber or slots. The application of this low pressure applies a back-pressure pulse to the trailing end of the belt after it has entered its storage pocket to stop it in the pocket.

To obtain these required pressure differentials when the processing chamber is comprised of plural columns, fast-acting valving can be connected to the bottoms of the columns to control the pneumatic pressure applied thereto. Similarly, fast-acting valving can be connected to the end of each storage pocket opposite the header to control the pneumatic pressure to each pocket. One of at least two pressures is applicable to the bottoms of the chamber columns and the end of each storage pocket. The pressure to the chamber is always opposite to the pressure to the selected pocket while transporting a belt along the header between a pocket and the chamber.

In order to protect the outer recording surface of the belt as it rotationally moves in the chamber, pressurized air bearings can be provided at all surfaces of the chamber where the belt might rub, except on the capstan surface which must engage the belt to drive it. If there is no slippage between the capstan and belt, there is no rubbing of the belt against the capstan.

When a multiple column arrangement comprises the processing chamber, it is preferable that at least two columns be used, and that at least two of the columns be tapered, that is having variable pneumatic tensioning forces that decrease toward the bottom of the column.

In order to maintain the belt stored in a pocket, it is preferable to maintain a pressure differential which holds the sides of the belt against the walls of its pocket. In order to do this, an opening is generally provided in a side of the pocket through which pneumatic pressure is applied to the inner volume of the belt to prevent the belt from collapsing in the chamber. If the belt is collapsed in the chamber, a danger exists of (1) developing a "set" in the belt, or (2) wrinkling the belt when it is attempted to move it to the header.

The back-pressure pulse causes pneumatic braking so that a belt can be stopped at a required position in the pocket upon being received from the header at high velocity without the belt hitting the end of the pocket and being damaged thereby with a possibility of collapse. This braking arrangement can be accomplished by providing grooves on opposite internal walls of the pocket. The grooves engage the opposite flat surfaces of the belt. As the belt moves into the pocket, the low pressure applied at the end of the pocket (which also is causing the belt to move from the header to the pocket) is applied through the grooves as they are being covered by the flat sides of the belt. This causes a frictional force between the flat sides of the belt and the pocket walls thereby creating a vacuum brake in a relatively simple manner which stops the belt very quickly at a desired location within the pocket.

The foregoing and other objects, features and advantages of the invention will be apparent from the following more particular description of preferred embodiments of the invention, as illustrated in the accompanying drawings.

Figure 20:
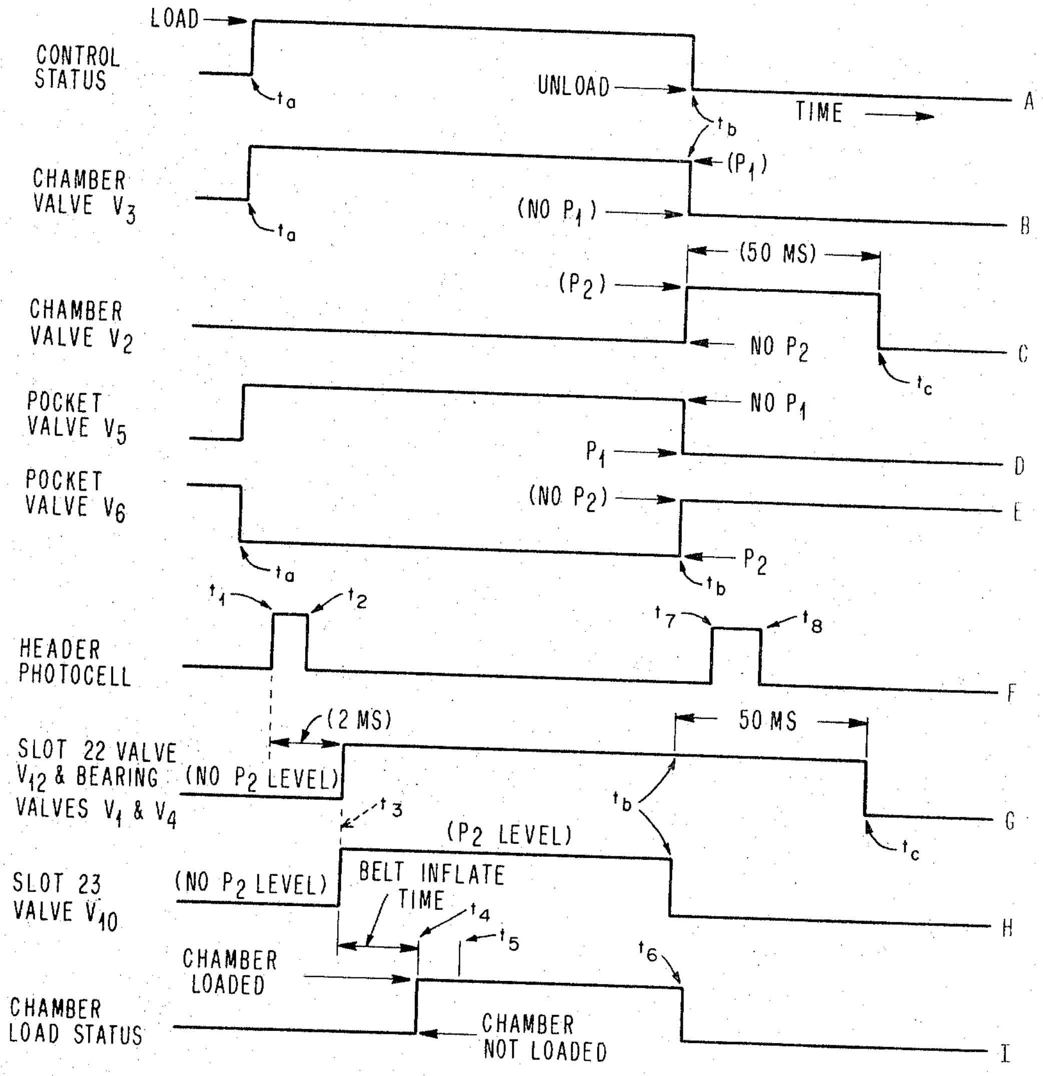
Figure 21:
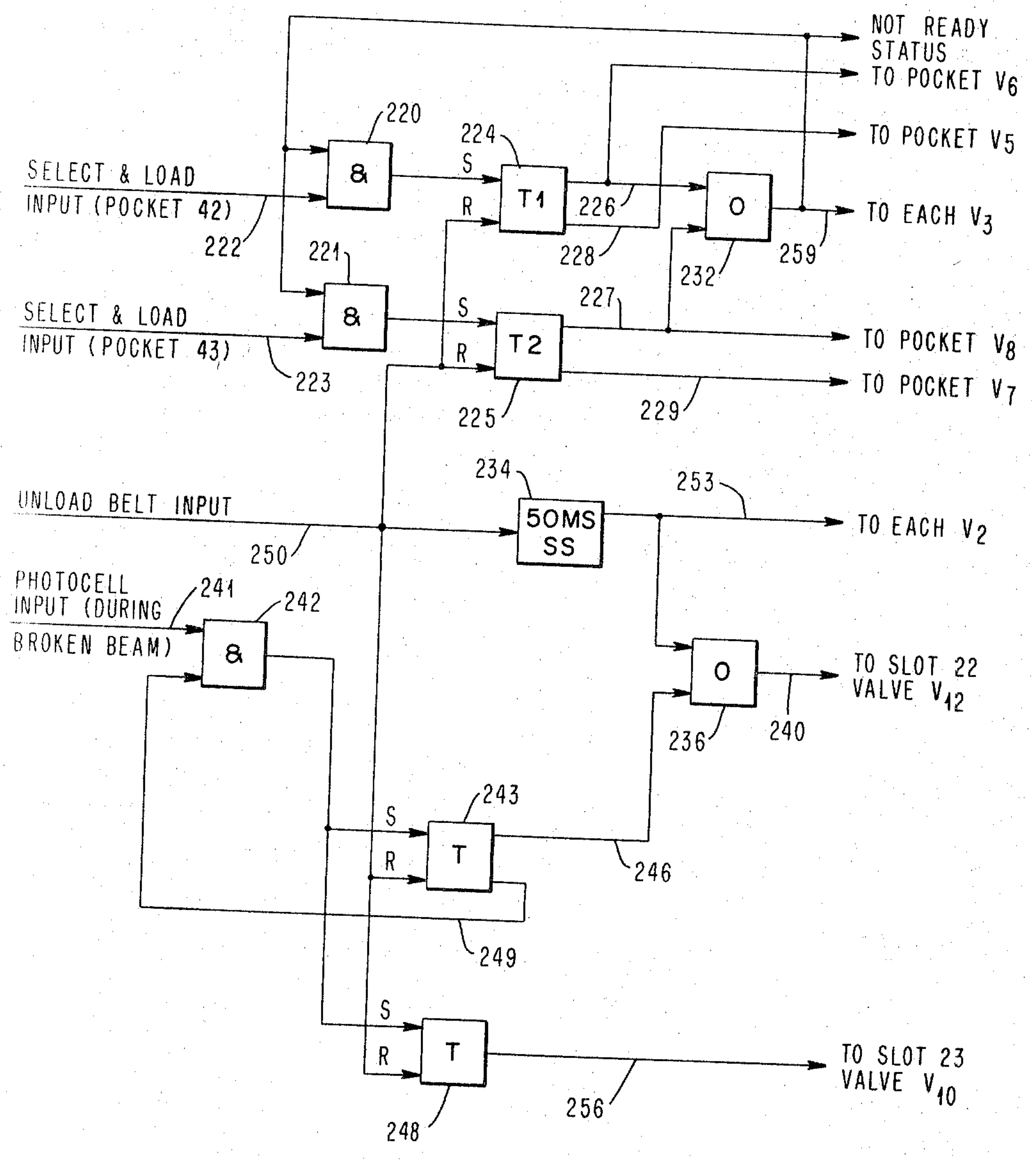
Figure 22:
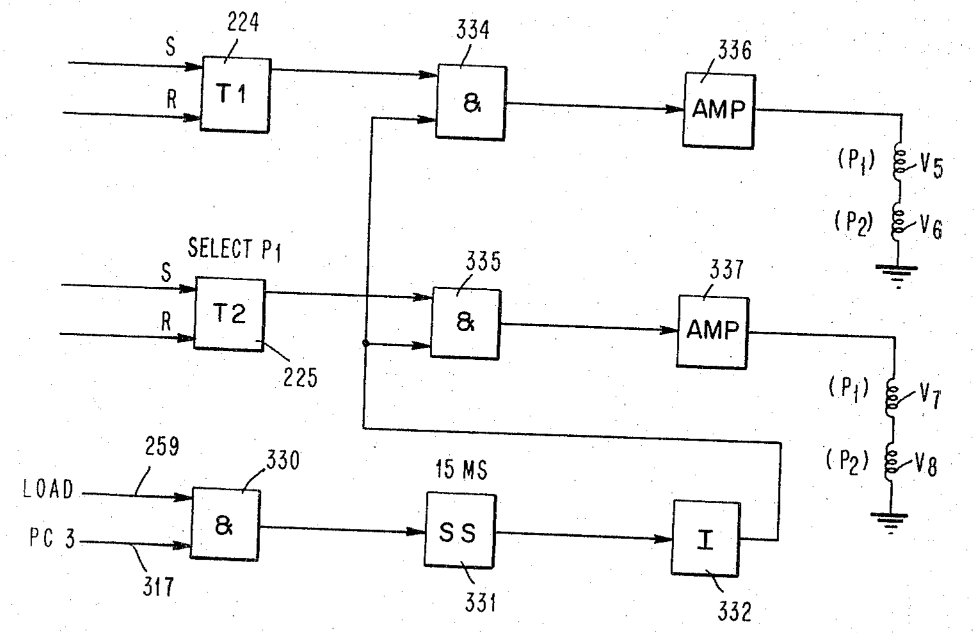
Figure 23:
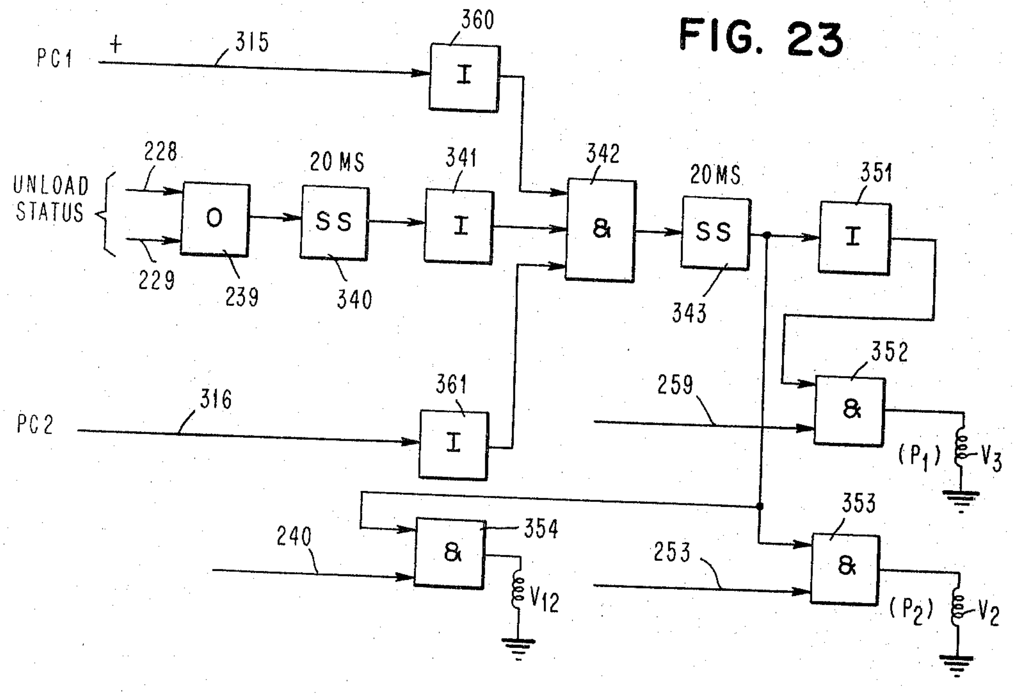
Figures 24, 25, 26:
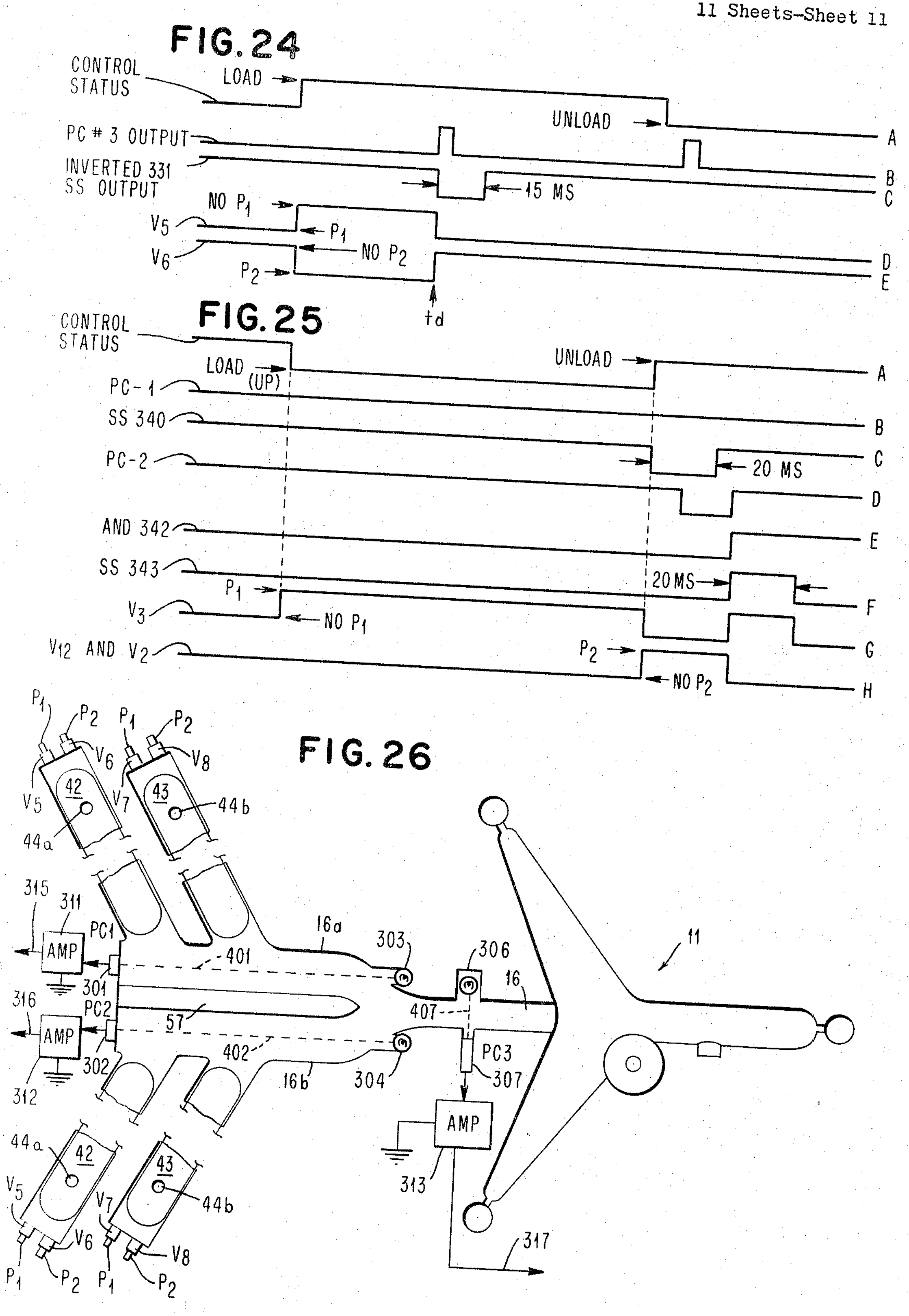

FIGURES 20A–I represent general sequence diagrams of operation for pneumatic belt devices without back-pulse operation;

FIGURE 21 is a logic circuit diagram for controlling the device according to the waveforms in FIGURES 20A–I;

FIGURE 22 shows a logic diagram for operating the invention;

FIGURE 23 shows another logic diagram for operating the invention;

FIGURES 24 and 25 provide waveforms used in explaining the invention; and

FIGURE 26 represents an embodiment of a pneumatic belt device containing the invention.

Figure 7:
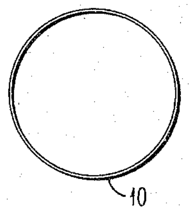
FIGURE 7 shows an end view of a belt which may be used with this invention.
Figure 8:
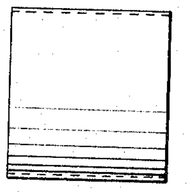
FIGURE 8 illustrates an elevational view of the belt shown in FIGURE 7.

FIGURES 7 and 8 illustrate a side view of a thin, flexible, endless belt 10, which may be used in this invention. Belt 10 may be constructed from a plastic or metal substrate, preferably non-magnetic. The substrate is thin, preferably not more than a few thousandths of an inch thick. The outer surface of the substrate is coated with a very thin magnetizable material on which information can be recorded at high densities, such as plated cobalt or nickel-cobalt or magnetic oxide in binder. Because of the construction of the substrate and magnetic surface, the belt must be delicately handled in order to avoid damaging its magnetic surface.

Figure 6:
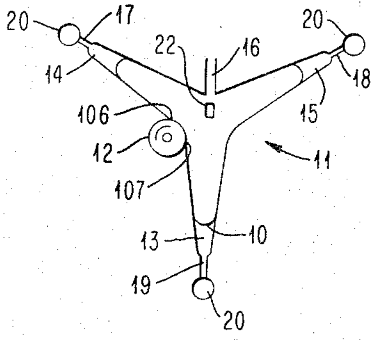
FIGURES 6, 9 and 10 represent various configurations which can be provided for processing chambers.

FIGURE 6 shows a processing chamber 11 in which a belt 10 is being supported. Chamber 11 comprises three tapered columns 13, 14 and 15 connected together at their upper ends except for a header 16 which connects to the chamber between columns 14 and 15.

A low air pressure (vacuum) $P_1$ is being applied to the bottoms of the columns through communicating passages 17, 18 and 19 which connect to ports 20. The vacuum at the bottom of the columns sucks respective looped portions of the belt into the columns and causes the belt to obtain the configuration of chamber 11. An opening 22 is formed on one wall of the chamber through which air at a higher pressure $P_2$ (such as atmospheric) can communicate with the inner volume of the belt to create a pressure differential on the opposite sides of the three loops in the columns.

Belt portions 106 and 107 on opposite sides of capstan 12 are being pulled in opposite directions by the differential pressures on adjacent loops which causes the intermediate portion of the belt adjacent to the capstan to be pulled into frictional engagement with the capstan. Since the capstan is rotating at a constant velocity in a counter-clock-wise direction in FIGURE 6, the belt surface engaging the capstan is forced to move at the capstan velocity because of the frictional engagement. However, the movement of belt portion 106 into its column 14 results in a corresponding out-of-column movement by the belt portion on the opposite side of the column 14, because of the tapered nature of the vacuum columns comprising the chamber. The tapered nature of the vacuum columns causes a self-balancing arrangement for the three loop positions in the three vacuum columns whenever any of the three loop positions is disturbed, such as occurs when a belt portion 106 is moved into a column, or when a belt portion 107 is moved out of a column. Consequently, the belt rotates around the chamber configuration with a stable position in chamber 11 at the velocity of the capstan surface.

A read-write head may be positioned in any of the columns to sense the magnetic surface as it moves by at a high velocity. Preferably the read-write head is positioned in one of the columns adjacent to the capstan to read or write on belt portions 106 or 107, since it appears that greater constancy of velocity is obtained for the belt portions adjacent to the capstan.

Figure 9:
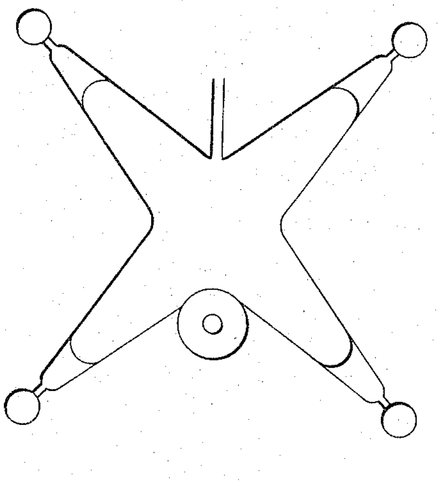
Figures 10, 11A, 11B:
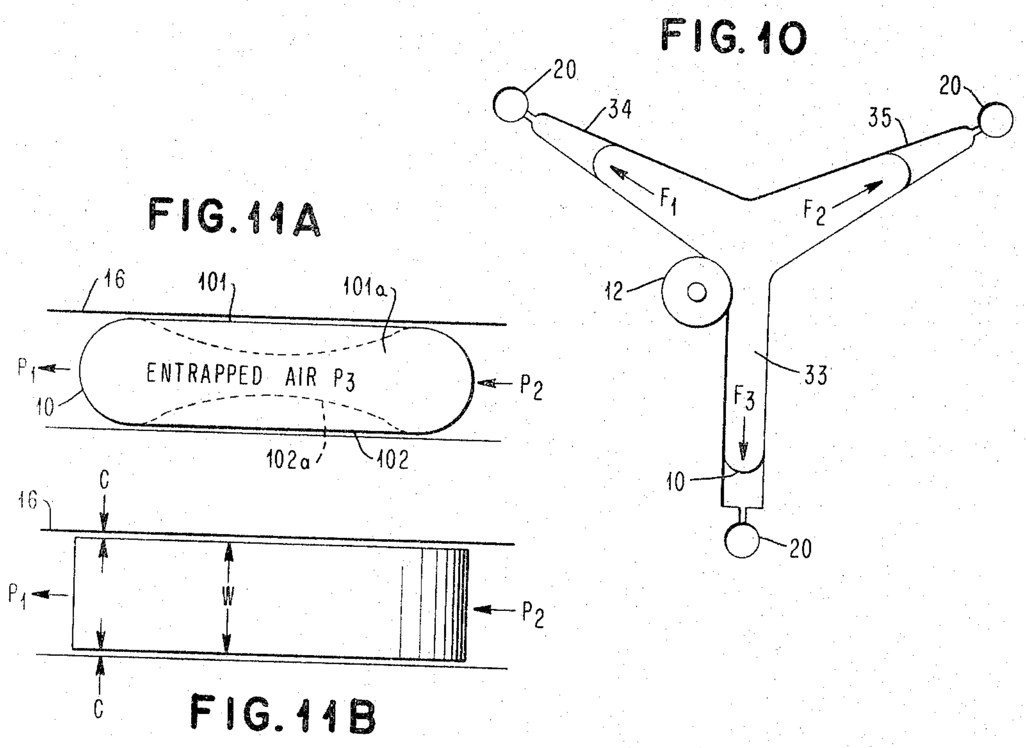
FIGURES 11A and 11B represent a compacted form of a belt within a header.

Innumerable other configurations may be provided for the processing chamber. In FIGURE 9 a four-column arrangement is provided in which each of the columns have a tapered cross-section. In FIGURE 10 three columns are provided in which only two columns are tapered with the third having parallel sides. At least two tapered columns are necessary in order to stably position a belt in the chamber. However, an advantage of having the third column with parallel sides is that a greater variation is permitted in belt size since parallel sides permit a longer column.

Figure 5:
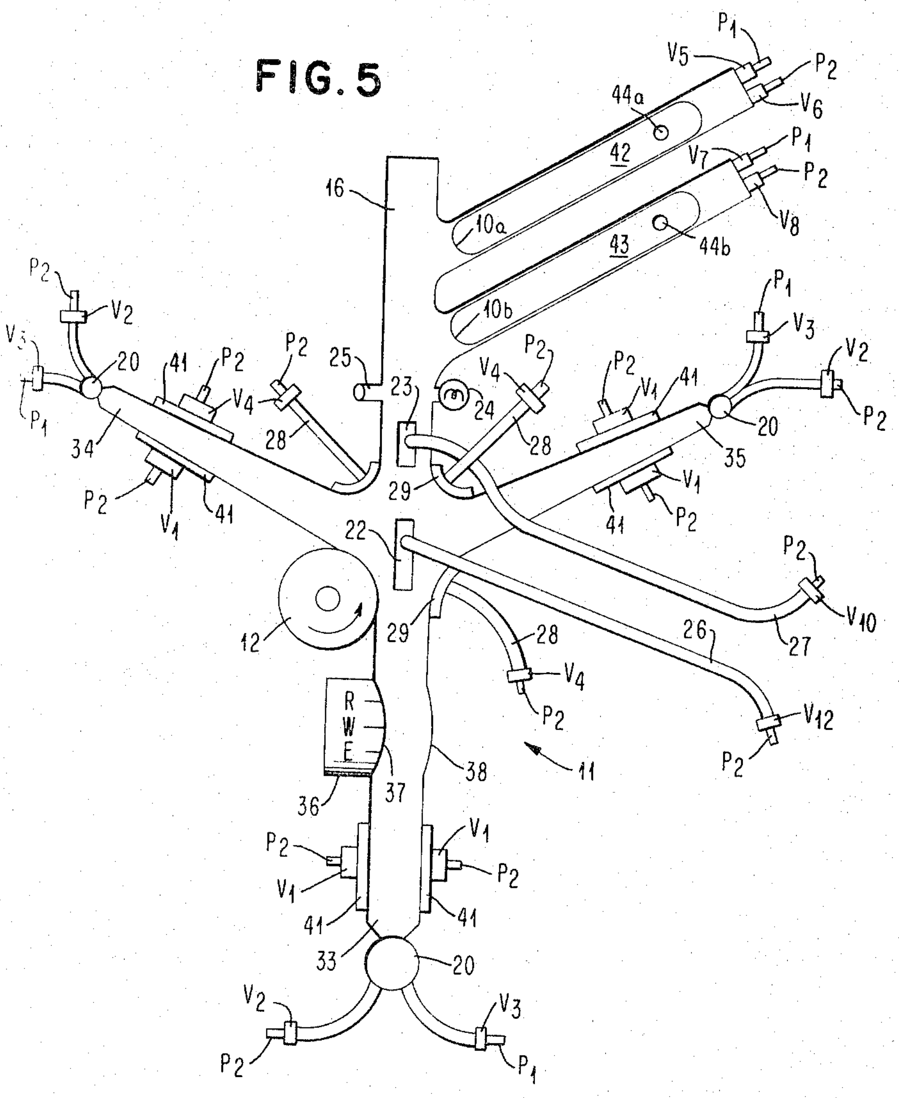
FIGURE 5 shows a schematic arrangement of a pneumatic belt device.

FIGURE 5 shows a schematic view of a belt-handling system utilizing the basic chamber configuration shown in FIGURE 10. Two belts 10a and b are shown in FIGURE 5 in respective pockets 42 and 43, that connect to header 16; however any number of pockets with respective belts 10 can be connected to header 16 in a similar manner, such as by extending the length of header 16. Either of belts 10a or b can be randomly accessed by being selectively moved from its pocket 42 or 43 into processing chamber 11, and replaced into its original pocket 42 or 43. The manner of accessing a respective belt, moving it to the chamber, and moving it back to its respective pocket, is all done pneumatically in FIGURE 5 without the intervention of any mechanical item into the direct path of the belt. Control for belt movement is obtained by electromagnetic actuation of a plurality of fast-acting pneumatic valves $V_1$, $V_2$, etc. which are actuated in a particular sequence in order to obtain required belt movement.

In FIGURE 5, the processing chamber comprises columns 33, 34 and 35 having a similar basic configuration to that shown in FIGURE 10, except that the gaps of an erase (E), write (W), and read (R) head assembly 36 project into the side of parallel-walled column 33. The rounded surface 37 of the head assembly projects into the column and pulls the tape away from the column wall to create tension of the tape against the heads to enable reading, writing engagement with the magnetic surface on the outer side of the belt. The opposite wall portion 38 of the column is shown curved parallel to surface 37 of the head, in order to maintain proper tensioning forces on a belt while it is being loaded into chamber 11.

At the bottom of each column is a respective coupling chamber 20. Valves $V_2$ and $V_3$ connect to each coupling 20. Valves $V_3$ switch a source of low preessure $P_1$ to the columns, and valves $V_2$ switch a source of high pressure $P_2$ to the columns. Although three valves $V_2$ and $V_3$ are shown, a single valve can replace each, since all of shown valves $V_2$ operate in unison, and all of shown valves $V_3$ operate in unison.

Each of belt storage pockets 42 and 43 has a pair of valves for switching pressures $P_1$ and $P_2$ to an end of each pocket. Thus pocket 42 has valves $V_5$ and $V_6$ connected to the sources of pressures $P_1$ and $P_2$; and pocket 43 has valves $V_7$ and $V_8$ connected to the same sources of pressure $P_1$ and $P_2$.

A belt 10 is moved from a selected pocket into chamber 11 by simultaneously connecting low pressure source $P_1$ to the chamber columns, and connecting high pressure source $P_2$ to the selected pocket. For example, this can be done by opening chamber valves $V_3$ (when valves $V_2$ are closed), and opening pocket valve $V_6$ (with $V_7$ closed) for accessing belt 10a. The difference in pneumatic pressure between chamber 11 and the opposite end of a pocket 42 or 43 causes the belt to shoot out of the respective pocket, down header 16, and into chamber 11.

FIGURE 11A illustrates the physics involved in moving a belt 10 along header 16. The opposite sides 101 and 102 of the belt initially should be substantially parallel to each other. Thus a quantity of air is entrapped within the volume of belt 10. A pressure $P_3$ exists within the loop which initially is greater than low pressure $P_1$ and is nearly the same as high pressure $P_2$. A pressure differential along header 16 acts across the belt as a force caused by low pressure $P_1$ at the leading end of belt 10, and a force caused by high pressure $P_2$ at the trailing end of the belt. These pressures act against pressure $P_3$ within the belt. The net pressure at the leading end is $(P_3-P_1)$ and the net pressure at the trailing end is $(P_3-P_2)$. The resultant pressure differential acting on the belt is therefore $P_2-P_1$.

After movement of the belt begins down the header, a small amount of deflation occurs; and the sides of the belt tend to bow inwardly (as shown by dashed lines in FIGURE 11A) so that the moving belt acquires a bone shape. While the belt is being transported, the pressure actually reaching its leading end is greater than source pressure $P_1$, and the pressure actually reaching its trailing end is less than source pressure $P_2$ because of changes in air volumes on opposite sides of the belt during its movement.

In order to assure that the belt sides 101 and 102 are initially parallel, an opening 44 is provided in the wall of each pocket to bleed high pressure $P_2$ into the center of the belt and insure that it remains full of entrapped air. The low pressure valves $V_5$ and $V_7$ are normally maintained open so that low pressure is applied to the belt storage pocket.

Further, it is necessary that the air remain entrapped within the inner volume of the belt substantially throughout its movement between a selected pocket and chamber 11. The air is maintained entrapped by having only a minimum clearance C, shown in FIGURE 11B, since the entrapped air can only escape through clearance C along the ends of the belt under the influence of its internal pressure $P_3$ in relation to the pressures at opposite ends of the belt. The clearance C should be, for example, not greater than a few thousandths of an inch and it is relative to the width W of the belt. It is the ratio $C/W$ which determines the rate of loss of entrapped air, so that the air can be entrapped for a longer period by making the belt wider for a given side clearance dimension C. For this reason, the pneumatic operation of the system tends to be better with wide belts, such as having a three inch width with 0.003 inch clearance.

As the belt moves down header 16, it breaks a light beam passing across header 16 from a light 24 to a photocell 25. In response to the beam interruption valves $V_{10}$ and $V_{12}$ are opened. High pressure $P_2$ is applied through these valves and openings 23 and 22 to the inner portion of the belt, which is aligned with these openings. The response time between beam interruption and air flow through $V_{10}$ and $V_{12}$ permits the belt to move into alignment with slots 23 and 22 before air flow begins therethrough. This air flow through slots 23 and 22 enters the inner volume and inflates the belt into conformity with the chamber as different portions of the belt are being sucked into the three different columns 33, 34 and 35.

After the belt has inflated into conformity with chamber 11, valve $V_{10}$ can be closed, since the bleeding of air through opening 23 at that time no longer reaches the inner volume of belt 10.

Rotation of capstan 12 may be in either direction.

Pressurized air lubrication is provided between the walls of chamber 11 and all points where the belt might rub (except on the capstan 12 where initial rubbing would occur until the belt surface reaches the velocity of the capstan surface). Pressurized air lubrication may be provided through a number of porous bearings which may be any type such as porous bronze or ceramic, etc., positioned at areas where the belt might rub without air lubrication. Porous bronze bearing inserts 29 are provided at the three rounded areas between the columns (not occupied by the capstan 12) where rubbing is likely to occur. These porous bearings are connected by tubes 28 to valves $V_4$ which switch the source of high pressure $P_2$ to these porous bearings in response to actuation of photocell 25 by the braking of the light beam by a belt moving toward chamber 11. Furthermore, another set of porous bronze bearings 41 is provided on opposite sides of each column 33, 34 and 35 near their bottoms where belt-looped portions move across the columns, as is better seen in FIGURE 1, as belt portions 143, 144 and 145 move across the respective columns as the belt is being rotated by capstan 12. In FIGURE 5, the air to porous bronze bearings 41 is switched from the source of pressure $P_2$ by means of valves $V_1$ which are actuated by photocell 25 in the same manner as described for valves $V_4$. Since all valves $V_1$ and $V_4$ are actuated simultaneously, their function can be performed by a single valve that can connect the pressure $P_2$ to each of the respective bronze bearings.

Figure 1:
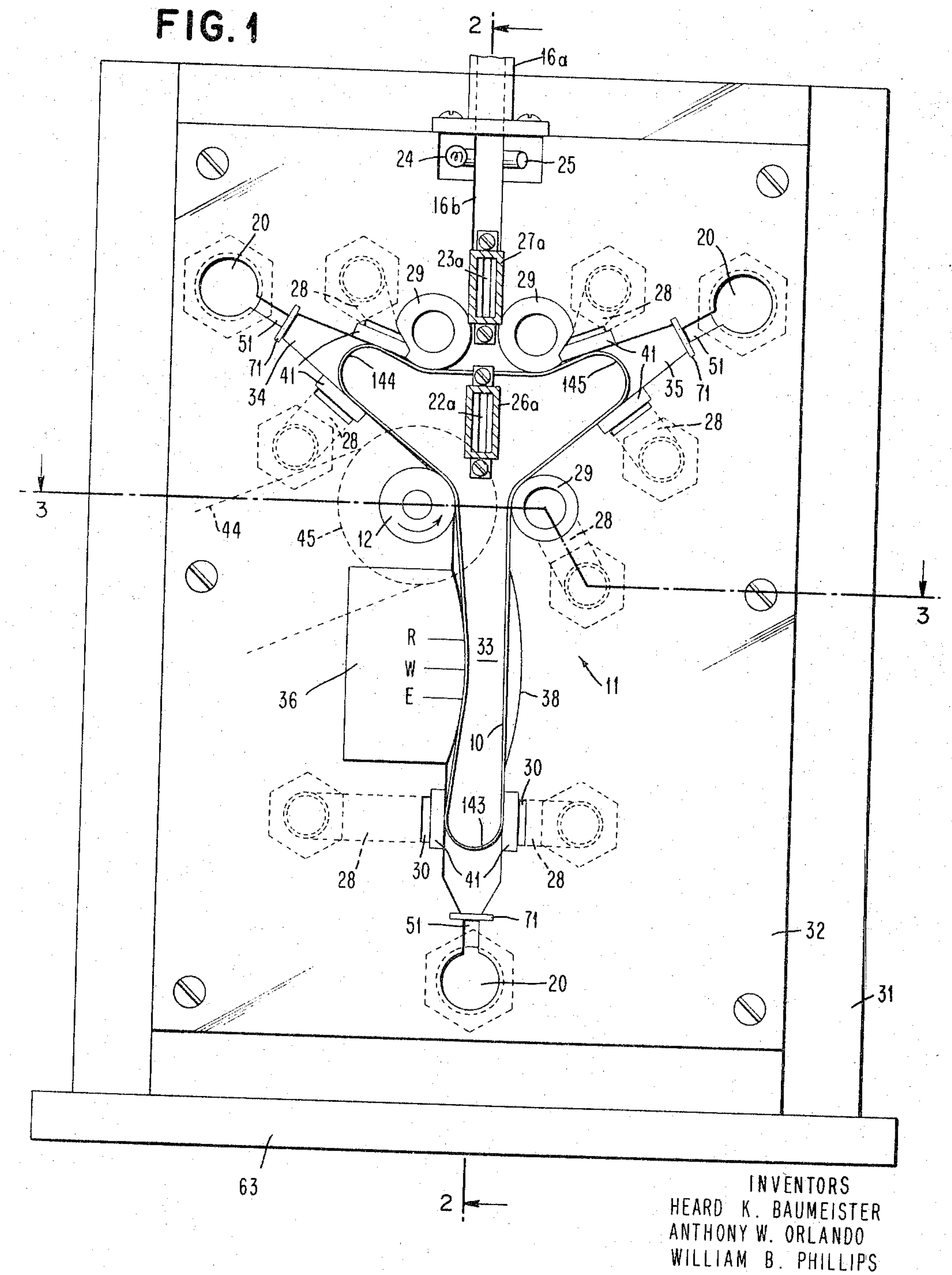
FIGURE 1 is an elevational view of a belt information processing chamber.
Figure 2:
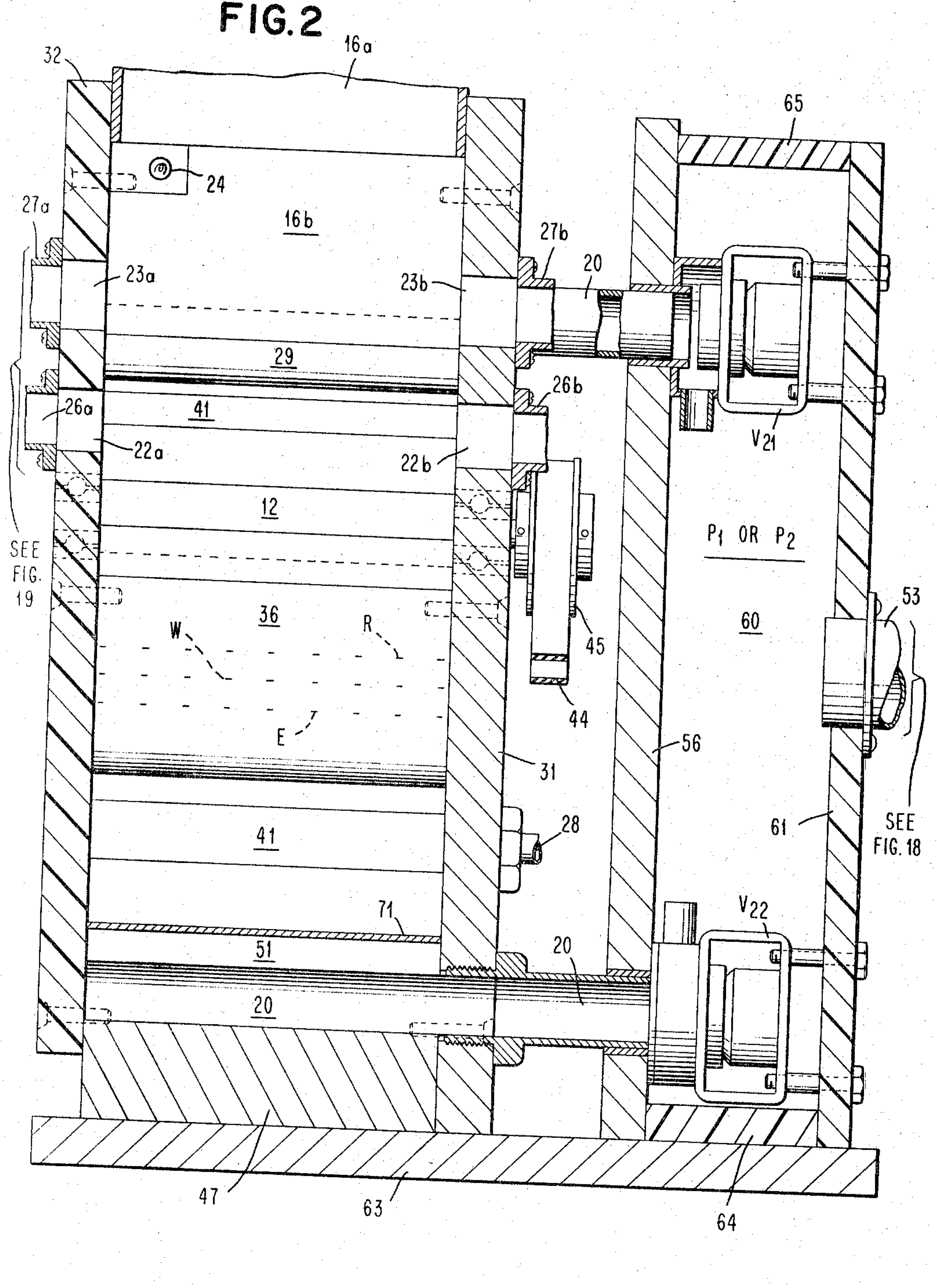
FIGURE 2 represents a view of section 2—2 in FIGURE 1.
Figure 3:
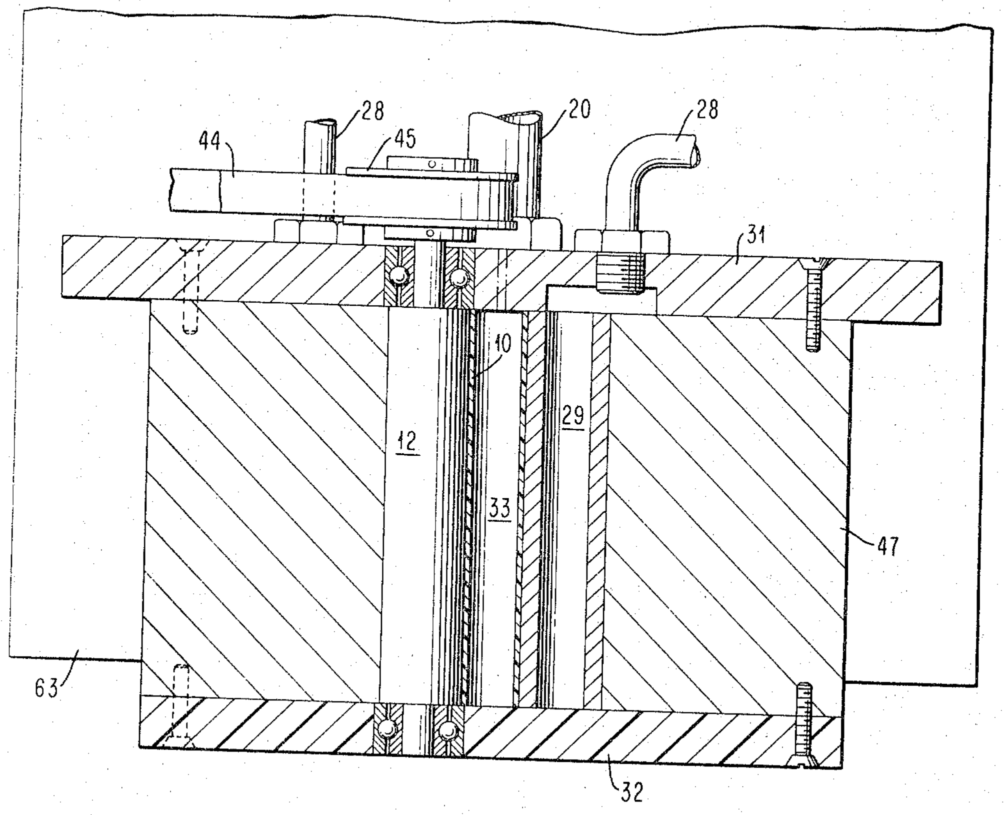
FIGURE 3 is a view of section 3—3 in FIGURE 1.

FIGURES 1, 2 and 3 show different views of a detailed construction of a processing chamber 11 designed along the schematic lines described for FIGURE 5. Chamber 11 may be formed as an opening in a solid slab of material 47, which may be metal, ceramic, glass, plastic, etc. The best material for the walls of chamber 11 is that which causes the least belt wear. Thus chamber 11 can be formed as a cavity in a single piece of solid material, or it can be formed in two symmetrical halves which meet along section line 2—2 in FIGURE 1.

A transparent glass or plastic front cover 32 is fastened by screws or otherwise to the front surface of block 47 to make an air-tight seal for chamber 11.

Openings adjacent to the main chamber are provided in block 47 in order to insert appendages for chamber 11, such as read-write head 36, porous bronze bearings 29 and 41, and capstan 12.

Three valve connecting ports 20 are also formed in block 47 along with short passages 51 which respectively connect the ports to the bottoms of the respective columns 33, 34 and 35. A large pore screen 71 is provided across the entrance of each passage 51 to a column. A passage 30 is also formed behind each of the flat porous bronze bearings 41. The cylindrical porous bearings 29 are inserted in cylindrical openings formed within block 47. Such cylindrical openings are open on their side facing main chamber 11, so that when each bearing 29 is inserted into its opening, it protrudes slightly into the cavity of chamber 11 in order to provide a bearing surface over which air lubrication is provided. Each porous bearing 29 is centrally hollow, through which air can be moved to its porous surface openings from an externally valve-controlled source of pressure $P_2$.

A portion of header 16 adjacent to chamber 11 is also formed in block 47 and it is designated 16*b*. Its internal dimensions are the same as those of the external portion of header 16, designated as 16*a* in FIGURE 1, which has an end flange bolted to block 47 in alignment with header portion 16*b*. Openings are also formed in block 47 for a light source 24 and photocell 25.

A belt 10 is also shown in FIGURE 1 within chamber 11, looped into the columns by vacuum pressure provided at ports 20 and high pressure provided at slot 22. It is noted that belt 10 does not conform to the concave opening 38 in column 33, since that portion of the belt is straightened by the force of the vacuum at the bottom of column 33 acting on the bottom of the belt loop in column 33.

FIGURE 2 shows a side sectional view along section line 2—2 in FIGURE 1; the section passes centrally down column 33 and header sections 16*b* and 16*a*. Belt 10 is not considered within chamber 11 for the purposes of FIGURE 2.

In FIGURE 2, a back cover 31 and front cover 32 are shown fastened to the block 47 to make an air-tight seal about chamber 11.

Figure 19:
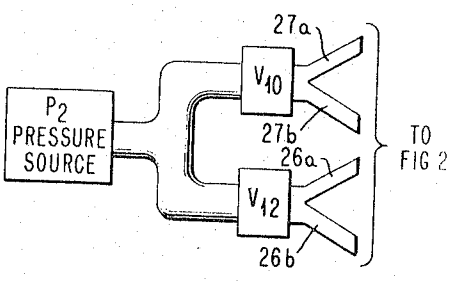

A pair of pipes 26*a* and 27*a* connect to slots 22*a* and 23*a* passing through front cover 32. Pipes 26*a* and 27*a* are continued as pneumatic pipes shown in FIGURE 19. FIGURE 19 shows pipes 26*a* and *b* connecting to valve $V_{12}$; and pipes 27*a* and *b* connect to valve $V_{10}$. A source of pneumatic pressure $P_2$ connects to the other side of valves $V_{10}$ and $V_{12}$. Thus respective electromagnetic actuation of valves $V_{10}$ and $V_{12}$ can connect source $P_2$ to either or both of pipes 26 or 27.

Capstan 12 is driven by a belt 44 and pulley 45 arrangement by means of a constantly rotating electric motor (not shown), so that the capstan rotates continually at a constant velocity. FIGURE 3 provides another sectional view along broken sectional line 3—3 through block 47 and its back and front covers 31 and 32. Pipes 28 connect to valves $V_4$ (see FIGURE 5) for switching pressure source $P_2$ to the porous bronze air bearings 29.

In FIGURE 2, each port 20 is connected by a respective pipe to a valving chamber 60. Chamber 60 includes three valves, one for each of the three ports, of which valves $V_{21}$ and $V_{22}$ are shown in FIGURE 2. Chamber 60 is airtight and connects to a tube 53 to receive either pressure $P_1$ or $P_2$ from FIGURE 18 which shows the remainder of pipe 53 and its appendages. Thus pipe 53 connects to valves $V_2$ and $V_3$ which respectively can switch either pressure $P_1$ or pressure $P_2$ to pipe 53 and chamber 60.

Figure 18:
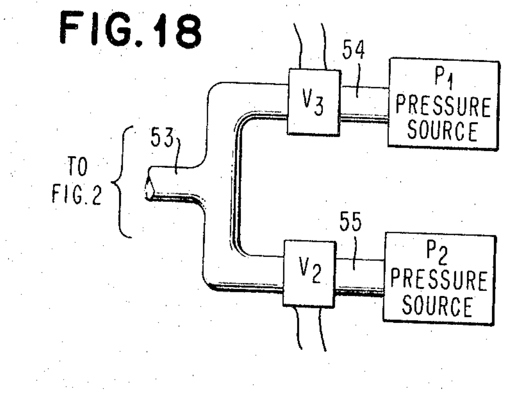
FIGURES 18 and 19 represent different valve and pressure source arrangements.

Valves $V_{21}$, $V_{22}$ and $V_{23}$ (not shown) within chamber 60 obtain quicker pneumatic switching to the columns than is obtainable directly with the valves $V_2$ and $V_3$ shown in FIGURE 18, due to the smaller air volume controlled by $V_{21}$, $V_{22}$, and $V_{23}$. This quicker response requires prior actuation of valves $V_3$ or $V_2$ so that pressure $P_1$ or $P_2$ in chamber 60 reaches a substantially steady-state value before actuation of valves $V_{21}$, $V_{22}$ and $V_{23}$. Where a slower response is sufficient, valves $V_{21}$, $V_{22}$ and $V_{23}$ can be eliminated.

Figure 4:
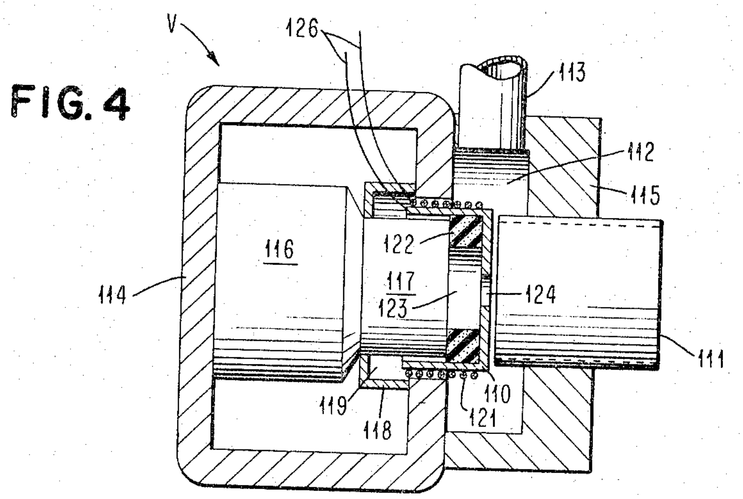
FIGURE 4 show a cross-sectional view of a fast-acting valve which can be utilized in embodiments of this invention.

FIGURE 4 shows a basic electrically-operated pneumatic valve capable of high speed opening and closing. Its basic configuration can provide each of the valves mentioned herein. In FIGURE 4, each of the cross-hatched sections can be a solid of revolution. A moving-coil bobbin 110 provides the valve action by sealing or not sealing the end of a tube 111 to prevent or permit the flow of air between tubes 111 and 113 through a chamber 112. An electromagnetic coil 121 having electrical terminals 126 is wound about bobbin 110. Terminals 126 connect to a current source (see FIGURE 21) that controls the operation of the valve. Opposite directions of current cause the bobbin to move in opposite directions. Coil 121 and its bobbin portion are located in a small gap in a magnetic path comprised of a permanent magnet 116 having a smaller diameter pole 117 and a high permeability metallic member 114. The bobbin is supported on pole 117 by means of a sponge-rubber ring 122 between the inner side of the bobbin and the surface of pole 117. Ring 122 can provide a spring action that normally maintains the valve either open or closed when electrically de-energized. A hole 124 is provided centrally through valve 110 in order that the cavity 123 within ring 122 will not trap air that might cause the valve to operate sluggishly. When valve 110 engages the end of tube 111, it is sealed, since the air cannot escape from cavity 123. A metal seal 118 between pole piece 117 and magnetic path 114 provides a sealed air chamber 119 which stops air leakage from chamber 112 through the magnetic gap from passing through any opening (if there is any) in magnetic path 114, and also provides a smaller volume for pneumatic wave reaction.

In FIGURES 1 and 2, head assembly 36 may have plural head gaps which align with (for example) eight different tracks, with adjacent gaps being laterally separated by eight tracks (for example). Thus by laterally incrementing a head to eight different positions, 64 tracks can be read-write serviced by this arrangement. For each track, there are three head gaps E, W, R for respectively erasing, writing, and reading the magnetic surface of the belt. The gaps for any one track are spaced far enough apart to avoid substantial electrical interference with each other. Means for incrementing the heads laterally is not shown, since means for such incrementing is well known in the art such as the description found in U.S. Patent 2,694,110 to B. Roberts.

Figure 17:
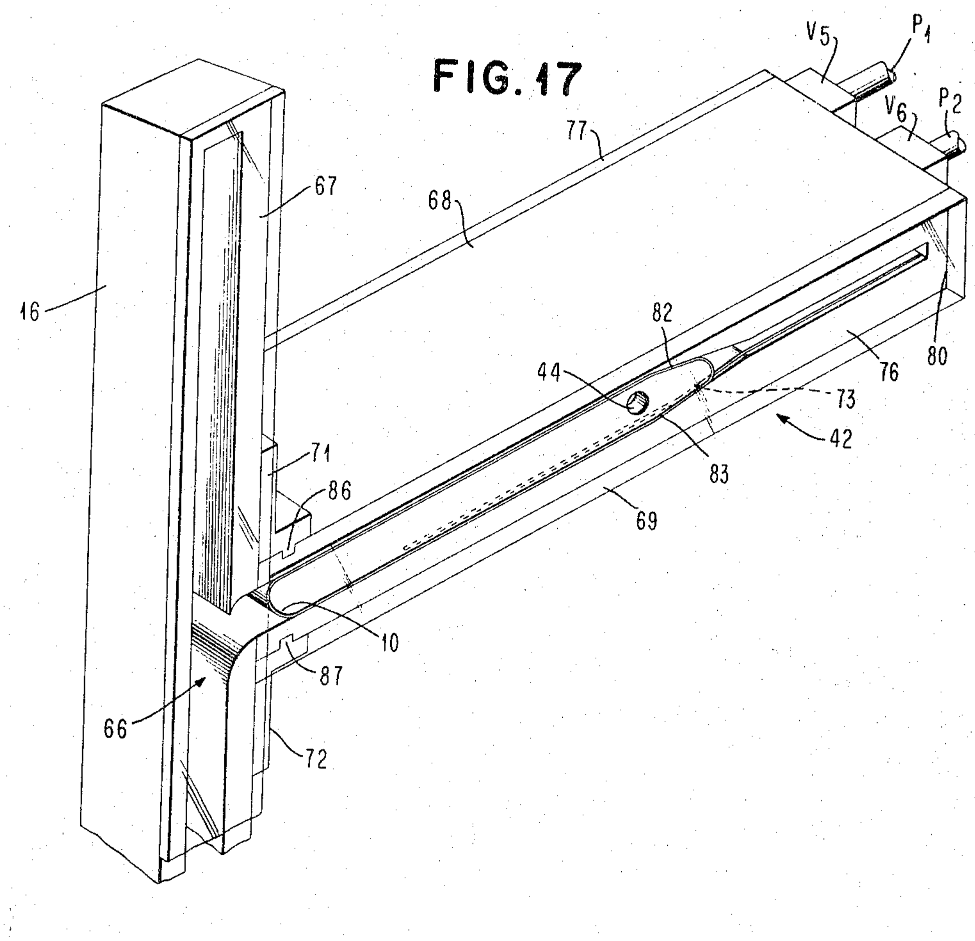
FIGURE 17 illustrates an isometric view of a storage pocket and its connection to a header.

FIGURE 17 shows an isometric view of a single storage pocket 42. Pocket 43 and any further number of pockets may be identical and may be placed side by side with a similar entrance 66 into header 16. The entrance 66 of pocket 42 into header 16 is an opening which may be curved generally in the direction that the belt is intended to take as it turns upon entering header 16 to move toward chamber 11. Pocket 42 (which may be a cartridge) is comprised of opposite walls 68 and 69 and be curved generally in the direction that the belt is internal volume of the pocket can be viewed to inspect whether or not a belt is within it. The back wall 80 has respective openings that connect to valves $V_5$ and $V_6$ which are respectively connected to the sources of pressures $P_1$ and $P_2$.

The inner surfaces of walls 68 and 69 engage the opposite surfaces of belt 10. Walls 68 and 69 are only a few one-thousandths of an inch wider than belt 10 in order that the side clearance C mentioned in regard to FIGURE 11*b* is minimized to minimize leakage of air around the edges of the belt. Transparent side covers 76 and 77 are fastened against the edges of walls 68 and 69 to confine the volume therebetween in an airtight manner. A pair of brackets 71 and 72 are fastened to header 16 and have a pair of projections 86 and 87 which engage corresponding grooves in walls 68 and 69, so that pocket 42 can be slidably mounted as a cartridge onto header 16 by having its grooves dovetail with projections 86 and 87.

A taper is formed in the back inner spacing between walls 68 and 69 toward the rear of the pocket by means of tapered inner surfaces 82 and 83 shown in FIGURE 17. The taper provides a stopping location for positioning the belt within a pocket as it is moved into it.

The belt is maintained in a fixed position within its pocket by means of a pair of grooves in each wall 68 and 69 near their outer edges (of which one groove 73 in wall 69 is viewable in FIGURE 17). Each groove 73 starts near back wall 80 behind the belt and extends beneath the stored belt to a point about half-way along the belt, but the groove should not extend beyond the opposite end of the belt. The grooves 73 receive low pressure $P_1$ from valve $V_5$ and cooperate with an opening 44 in each pocket wall 76 and 77 passing high pressure $P_2$; this pressure differential forces the opposite sides of the belt flatly against the grooved surfaces of walls 68 and 69 in order to maintain the belt in storage position. Hence the low pressure source $P_1$ (vacuum) transmits its pressure down each groove 73 beneath the belt to suck the sides of the belt against respective inner surfaces of flanges 68 and 69. Opening 44 permits a source of high pressure $P_2$ (which may be atmospheric pressure) to pass into the inner volume of the belt to provide the pressure differential that prevents belt collapse. With air being transmitted through opening 44 to the inner volume of the belt, the belt remains in its blown up condition regardless of how long it is stored.

Another purpose for grooves 73 along with taper 82 and 83 is to enable a belt to come to a quick halt at a proper position when it is being shot from the chamber 11 to its assigned storage pocket 42. As the belt begins to enter pocket 42 from header 16 to a point where the front part of the belt passes hole 44, a braking action begins to occur due to the suction effect of the low pressure within grooves 73. The braking action slows down the belt until when it finally reaches tapered portion 82 and 83, the constriction of the tapered portion provides a final braking action which stops the belt at that location. After the belt is positioned within pocket 42, valve $V_5$ remains open in order to maintain the belt from collapse.

Other embodiment configurations of this invention are represented by FIGURES 12 through 16. Thus in FIGURE 16 a single chamber 11 is shown having two entrances respectively connected to two banks of belt storage pockets. Thus one bank of storage pockets 42*a–n* is connected to a header 16*c* which connects to storage chamber 11 between columns 14 and 15. In a similar manner another bank of storage pockets 43*a–n* connects to a header 16*d* which connects to chamber 11 between columns 13 and 15.

Figures 12, 13, 14, 15:
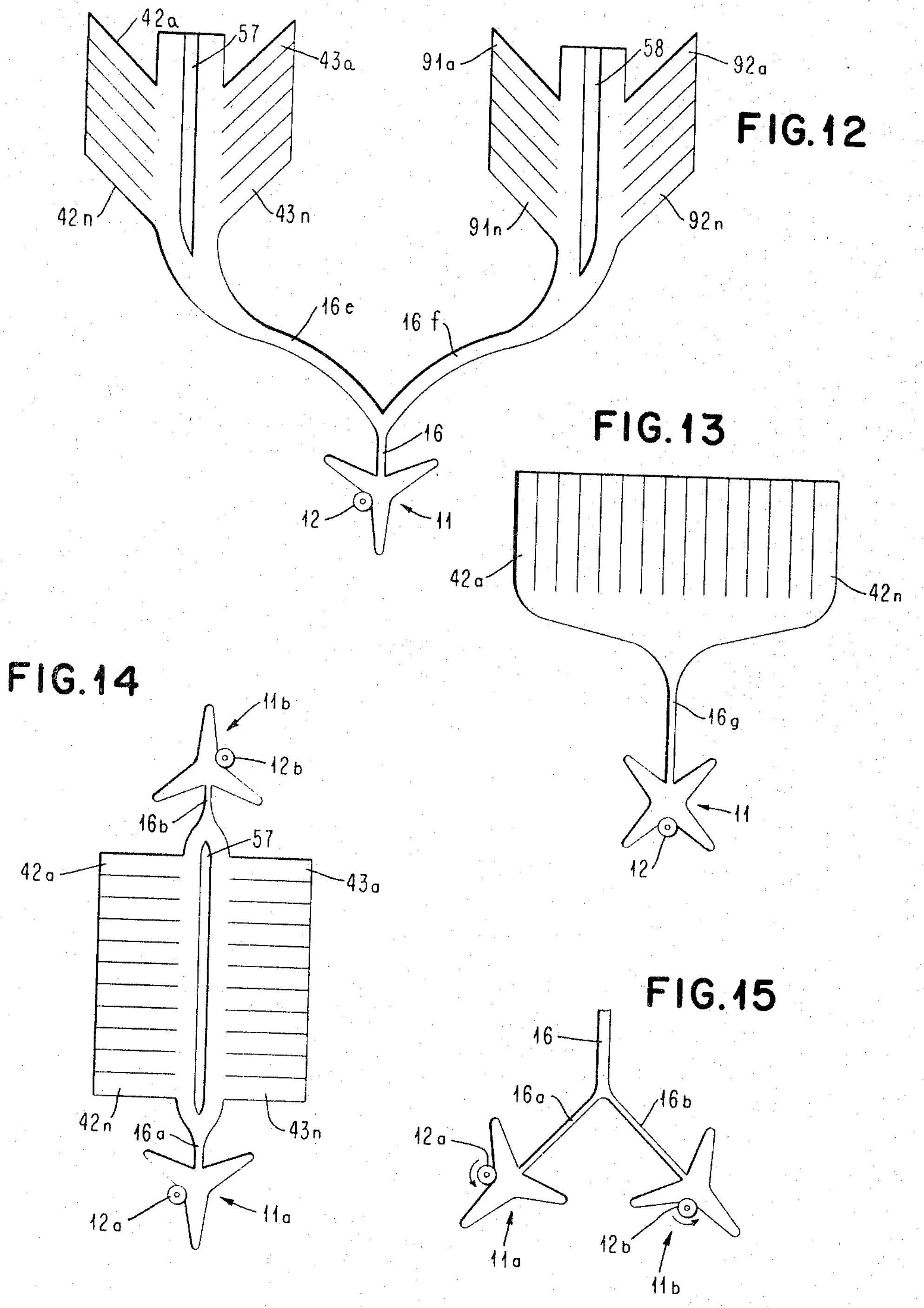
FIGURES 12, 13, 14, 15 and 16 show various forms of pneumatic belt devices, each comprising a single random-accessing information processing device.
Figure 16:
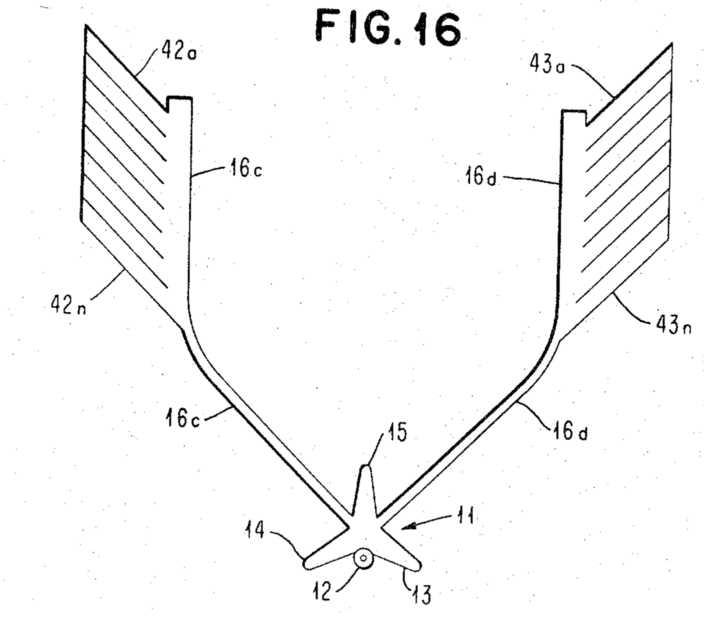

FIGURE 12 has certain basic similarities to FIGURE 16 but only a single entrance is provided to chamber 11, which otherwise is identical to that shown in FIGURE 6. Each header 16*e* and 16*f* connects to the main header 16 which enters chamber 11. Header 16*e* has banks of storage pockets 42*a–n* and 43*a–n* connected to opposite sides. Likewise the other header 16*f* has opposite banks of storage pockets 91*a–n* and 92*a–n*. A smooth barrier 57 is provided midway down the center of header 16*c*; and likewise a smooth barrier 58 is provided midway down the center of header 16*f*. The barriers 57 and 58 each extend across the width of their respective headers. Barriers 57 and 58 present a smooth surface to a belt leaving a respective storage pocket. Thus the bottom of each barrier 57 and 58 tapers with its respective header **16*e* or 16*f* in order to present a smooth transition to a belt moving toward chamber 11. Without barrier 57 or 58**, the belt would engage the various pocket openings on the opposite side, which may adversely affect the belt.

FIGURE 14 shows an arrangement with two processing chambers **11*a* and 11*b*, which can simultaneously process two belts 10. Two banks of storage pockets 42*a–n* and 43*a–n* are shown in FIGURE 14 connecting to headers 16*a*** and *b*. A barrier 57 of the same type as described with respect to FIGURE 12 is provided between banks 42 and 43. The storage pockets are positioned perpendicular to header 16 in FIGURE 14 in order to present the minimum angle of approach to both processing chambers **11*b* and 11*a*. Thus in other figures, such as FIGURE 12, the cartridges were more angled toward the direction they were required to move in header 16** in order to minimize the bend that a belt was required to make in moving between the cartridge and the header.

FIGURE 13 shows another configuration for this invention in which a bank of storage pockets **42*a–n* are all positioned in the direction of header 16*g*. It fans out with a funnel shape at the top to encompass the openings in all pockets in the bank. In FIGURE 13 the header connects to a processing chamber 11 of the type shown in FIGURE 9. One advantage of using more than three columns in a processing chamber 11** is to reduce the size of the processing chamber for a given belt circumference. Thus more than four columns can also be used. However, when more than three columns are used, all or all but one should be tapered columns in order to provide stability for the position of the belt therein.

FIGURE 15 shows two independent processing chambers **11*a* and 11*b* connected to the same main header 16 by means of branch headers 16*a* and 16*b*. Thus capstans 12*a* and 12*b* can independently and simultaneously drive belts in the respective chambers 11*a*** and *b*. The main header 16 in FIGURE 15 can replace any of the headers 16 in any of the other FIGURES 5, 12, 13, 14 or 16. By having two chambers 11 per system, read or write or erase operations can be performed simultaneously on two belts, although only one belt can be accessed to a chamber at one time. More than two chambers can also be provided per system by either connecting more chambers to the same header 16 or by connecting plural chambers to opposite ends of a header 16 in the manner shown in FIGURE 14 and branching therefrom.

FIGURES 20A–I provide sequence diagrams for explaining the timing of valve operations in relation to the chamber control status in loading a selected belt into chamber 11, and in replacing the belt back into its original pocket. FIGURE 20A illustrates two D.C. levels respectively representing the "chamber loaded" and "chamber unloaded" statuses by, for example, zero volts D.C. representing the unloaded status and 12 volts D.C. representing the loaded status. The "belt loaded" status voltage initiates a sequence of events which moves a selected belt to chamber 11 and maintains the belt within the chamber 11 as long as that status is maintained. On the other hand, the "unloaded status" voltage level can initiate a sequence of events which moves a belt from chamber 11 back to the assigned storage pocket for the belt and maintains the belt within its pocket.

A separate control status line can be provided for each belt, or a binary coded set of control status lines may be provided which are decoded to select a particular belt and indicate its control status, in a manner which may be similar to tape selection circuits found in present day computers. Input control status lines 222 and 223 are shown in FIGURE 21, either of which has its voltage level represented by FIGURE 20A.

FIGURE 20A shows the load status for a belt selected at a time $t_a$ and unselected at a time $t_b$. The remaining waveforms in FIGURE 20 can be referenced to the operation of the valves shown in FIGURE 5. Thus FIGURE 20B illustrates the operation of chamber valve $V_3$ in relation to the control status timing shown in FIGURE 20A. Valve $V_3$ opens at time $t_a$ when the control status voltage is changed from unload to load status for a selected belt. Valve $V_3$ thus applies very shortly thereafter a low pressure (vacuum) $P_1$ to the bottoms of each of the columns in chamber 11.

Simultaneously at time $t_a$ in FIGURE 20D, pocket valve $V_5$ is closed to shut off the vacuum pressure $P_1$ to the end of the pocket, and in FIGURE 20E, pocket valve $V_6$ is opened to apply high pressure $P_2$ (which may be atmospheric pressure) to the back part of the pocket. Hence shortly after time $t_a$, the belt is forced to move out of the pocket toward the header, since it has low pressure sucking it on one side toward the header and high pressure on its opposite side pushing it toward the header.

A short time after $t_a$, the belt is moving rapidly down the header, and its leading edge interrupts the light beam at a time $t_1$ shown in FIGURE 20F. The light beam interruption ends at time $t_2$ to terminate a pulse generated by the photocell beam interruption, shown in FIGURE 20F.

The photocell pulse is used to actuate a short delay period shown in FIGURE 20G as two milliseconds to represent the time that it takes the leading edge of the belt to move from the photocell to slot 23 in header 16. The delay period depends upon the speed of the belt, and the header distance between the photocell and slot 23. Valves $V_{10}$ and $V_{12}$ open at time $t_3$ in response to the delay period when the belt reaches slots 23 to permit high pressure $P_2$ to inflate the leading edge of the belt as it enters cavity 11. Pressure $P_2$ is simultaneously applied to slots 23 at time $t_3$ ahead of belt 10, which momentarily reduces the differential pressure moving belt 10 and tends to brake it as it is about to enter chamber 11. As the leading edge of the belt enters chamber 11, the airflow through slot 23 (and later through slot 22) begins to inflate the belt into conformity with the chamber cavity.

Thus the belt is substantially inflated as it enters the cavity and is pulled into the three columns by the suction of pressure $P_1$ being applied at the bottoms of the three columns. As the belt conforms to the shape of chamber 11, it is pulled against capstan 12. Belt tension against the capstan is maintained by the suction at the bottom of the adjacent vacuum columns; and the frictional engagement of the belt with the capstan causes the belt velocity to quickly rise to equality with the capstan surface velocity. Then it rotates in chamber 11 at the capstan surface velocity while maintaining the star-shaped chamber configuration.

The fluid-bearing valves $V_1$ and $V_4$ are also opened at time $t_3$ as shown in FIGURE 20G in order that the belt will receive fluid lubrication as it moves into conformity with the shape of chamber 11 and begins rotation. The shape of the belt will finally conform to the chamber 11 at a time $t_4$ shown in FIGURE 20I, and the belt will be accelerated to its constant nominal velocity at the time $t_5$ shown therein.

The belt will continue to rotate in chamber 11 until the control status changes from load to unload at time $t_b$ shown in FIGURE 20A.

In response to the change to unload status at time $t_b$, chamber valve $V_3$ closes to shut off vacuum pressure $P_1$ to the columns, chamber valve $V_2$ opens to apply forced air at pressure $P_2$ to the bottoms of the columns, pocket valve $V_6$ closes to shut off the high pressure $P_2$ to the pocket, and pocket valve $V_5$ opens to apply vacuum pressure $P_1$ to the pocket. Furthermore at time $t_b$, slot valve $V_{12}$ closes to shut off pressure $P_2$ to slots 23.

As a result the belt in chamber 11 finds a set of circumstances which forces it to move out of the chamber, along header 16, and into its selected pocket. The belt is being pushed out of the columns by pressure $P_2$ being applied to the bottom of the columns, and the belt receives suction pressure $P_1$ through header 16 from valve $V_5$ in the selected pocket.

As the belt moves out of chamber 11 it is necessary to deflate it partially so that it can conform to the walls of the header 16. As shown in FIGURE 20G, valve 10 remains open for about 50 milliseconds after time $t_b$, so that the source of pressure $P_2$ continues to be exposed to slots 22 (pressure $P_2$ may be atmospheric pressure). The belt cannot enter header 16 until air entrapped within it has been partly removed; and a delay is imposed upon the belt transfer to its pocket depending upon the rate of belt deflation as it is entering header 16. The differential pressure acting on the belt to wedge it into header entrance creates a pressure within the belt that is greater than pressure $P_2$ which causes air to flow from the belt to the source of pressure $P_2$ at a high rate during the deflation process. Thus by leaving valve $V_{10}$ open, deflation occurs faster than would be obtained by air leakage around the edges of the belt, and the belt is permitted to leave chamber 11 at a faster rate than otherwise would be permitted with less wear and tear on the sides of the belt engaging the entrance to header 16, which engagement forces the deflation.

At time $t_6$ (shortly after time $t_b$) shown in FIGURE 20I, the leading edge of the belt has formed in header 16 for movement to the selected pocket.

Shortly thereafter the leading edge of the belt interrupts the header photocell at time $t_7$ shown in FIGURE 20F. The interruption occurs until time $t_8$, which results in a pulsed output from the photocell which is longer than the pulse between times $t_1$ and $t_2$ due to the deflation operation. The pulsed output at $t_7$ may be used to open valves $V_{12}$ to force air at pressure $P_2$ into slots 23 after a time, such as 20 milliseconds, when the belt has completely cleared slots 23 while moving toward its pocket. The additional air from slots 23 provides an additional push to the belt in its movement toward its pocket. The actuation of valve $V_{12}$ in this case is momentary and ends at time $t_c$ when the belt has been stored in its assigned pocket. Also under some design conditions, it is desirable to shut off the chamber valves when the slot valves are opened for the additional push, so that the air pressure behind the moving belt does not become excessive.

Time $t_c$ can be determined in a number of different ways, such as: (1) by a fixed time from unload-status-initiation time $t_b$, or (2) by a fixed time from the chamber exit actuation of photocell 25, or (3) a photocell or other sensing device placed at the pocket for the sensing when the belt has reached the pocket.

Thus at time $t_c$, there is no belt within chamber 11 and all belts are within their assigned pockets 42 and 43, etc.; so that the device is then in a "ready status" for the selection of another belt by a controlling means, such as manually or automatically by a computer system which can select belts in a manner similar to the selection of a disk from a disk file attached to a presently used computer.

FIGURE 21 shows a logic diagram for obtaining electrical control of the respective valves in the system in the manner represented by the sequence diagrams in FIGURE 20A–I. In FIGURE 21 a pair of input lines 222 and 223 are provided for the respective selection of a belt in pocket 42 or 43 by energizing a selected one of these two lines. Selection is determined by setting one of a plurality of select triggers 224 and 225 by an input control pulse on one of leads 222 or 223. If any select trigger is set, an inhibiting "not ready status signal" is provided to the inputs of a pair of AND gates 220 and 221 to block any further selection by a new select signal until the prior select operation has been completely executed by loading and unloading a belt.

If execution is complete for the prior select signal, then each of triggers 224 and 225 is in reset status; and each AND gate 220 and 221 is in "ready status," in which they are conditioned to pass a select signal on any respective input lines to set the corresponding trigger.

Hence, when a particular select pulse is provided on one of lines 222 and 223 under a "ready status" condition, the appropriate one of triggers 224 or 225 is set. Then an output is provided from OR gate 232 back to AND gates 220 and 221 to inhibit any further selection until completion of the prior select command.

In this manner, the setting of trigger 224 brings up the voltage level on lead 226 and brings down the voltage level on lead 228 to provide signals that open valve $V_6$ and apply pressure $P_2$ to pocket 42 and close valve $V_5$. Simultaneously the voltage level on lead 126 passes through OR gate 232 to open valves $V_3$ and apply vacuum pressure $P_1$ to the bottoms of columns 33, 34 and 35. Accordingly, a differential pressure is applied to the belt in pocket 42, and it begins to move toward chamber 11.

During movement down header 16, the belt interrupts the photocell beam; and a pulse is provided on lead 241 to an AND gate 242. A trigger 243 in reset status conditions gate 242 to pass the pulse that sets triggers 243 and 248. Then an output from trigger 243 is brought up on lead 246 to actuate valve $V_{10}$ to apply pressure $P_2$ to slots 23. Likewise an output from trigger 248 passes through an OR circuit 251 to actuate valve $V_{12}$ to apply pressure $P_2$ to slots 22. Valves $V_{10}$ and $V_{12}$ do not pass substantial air flow for several milliseconds, during which time the internal portion of the belt moves into alignment with slots 23 and 22 for inflation.

The belt is then inflated and placed in the chamber against capstan 12, which revolves it so that information can be processed by means of head assembly 36 operating on the magnetic surface of the belt as it is being moved.

After the belt has been processed in chamber 11, a system controlling the device, such as a computer, brings up an unload belt signal (such as a pulse) on an input line 250 in FIGURE 21. The input pulse on line 250 at time $t_b$ shown in FIGURE 20A. This input pulse resets trigger 224 and assures that all of the other triggers 225, 243, 248 and 252 in FIGURE 21 are in reset status.

The resetting of trigger 224 causes low pressure $P_1$ to be applied to pocket 242, and high pressure $P_2$ to be applied to the bottom of each of the columns 33, 34 and 35. Thus the resetting of trigger 224 actuates pocket valves $V_5$ to open and $V_6$ to close and actuates chamber valve $V_2$ to open and $V_3$ to close with respect to each of the columns.

Furthermore the pulse on lead 250 at time $t_b$ actuates a 50 millisecond single shot 234 which provides an output through an OR gate 236 at the same moment that the other input through OR gate 236 drops due to the resetting of trigger 243. Hence valve $V_{10}$ remains energized to maintain pressure $P_2$ at slots 22.

Accordingly the circuitry in FIGURE 21 provides control for accessing a selected belt to chamber 11 and restoring the selected belt to its assigned pocket.

FIGURE 26 illustrates a form of the pneumatic belt device in which this invention is provided. In FIGURE 26 a chamber 11 connects to a header section 16 that branches into two symmetrical header sections 16a and 16b, each connecting to a separate pair of pockets 42 and 43. A barrier 57 separates 16a and *b*, as explained in previous embodiments.

Three photocells 301, 302 and 307 are provided. They cooperate with light beams 401, 402 and 407 which derive from light sources 303, 304 and 306, respectively. Light beam 407 passes transversely across header 16 adjacent to chamber 11. Light beams 401 and 402, respectively, pass along header sections 16a and 16b, respectively, across the entrances to each of pockets 42 and 43.

Whenever a belt is loaded from a pocket 42 or 43 into chamber 11, the last sensed act of the belt prior to entering chamber 11 is sensed by a photocell because of the interruption of beam 407 by the leading end of the belt.

On the other hand, when the belt is being unloaded from chamber 11 into its assigned pocket 42 or 43, the last sensed act of the belt is the restoration of beam 401 or 402 as the belt completely enters its assigned pocket.

It is accordingly necessary to distinguish the interruption of beam 407 in the case of loading the belt, from the restoration of either beam 401 or 402 in the case of unloading a belt. Circuit logic for accomplishing this described interruption or restoration of a light beam is provided in FIGURES 22 and 23. FIGURE 22 provides logic for accomplishing a pneumatic backpulsing when the belt is being loaded; and FIGURE 23 accomplishes a pneumatic backpulsing of the belt when the belt is being unloaded into its assigned pocket.

Each of FIGURES 22 and 23 cooperate with FIGURE 21. Since FIGURE 21 includes logic for operation with only two pockets 42 and 43, it is necessary to assume two more select triggers similar to triggers 224 and 225 in order to handle two more belts to represent the four belts shown in FIGURE 26. There is, however, no basic logical difference needed to handle two more belts.

Thus in FIGURE 22, triggers 224 and 225 are the like-numbered triggers in FIGURE 21. A pair of AND gates 334 and 335 have inputs respectively connected to outputs of triggers 224 and 225.

Amplifiers 336 and 337 respectively amplify the outputs of AND gates 334 and 335 in order to power the driving operation for the pocket pneumatic valves. In this manner, the electromagnetic coils of valves $V_5$ and $V_6$ are serially connected to the output of amplifier 336; and the coils of valves $V_7$ and $V_8$ are serially connected to the output of amplifier 337. Valves $V_5$ and $V_6$ are oppositely actuated by the series current from the amplifier, so that when pressure $P_1$ is provided by valve $V_5$ when pressure $P_2$ is shut off by valve $V_6$, and vice versa. In the same manner valves $V_7$ and $V_8$ are connected for opposite actuation of pressures $P_1$ and $P_2$ by the output from amplifier 337.

Also in FIGURE 22, an AND gate 330 receives a load signal on lead 259, resolving the ORed outputs of the select triggers 224, 225, etc. (see FIGURE 21). Thus a signal for selecting and loading any belt in the device conditions input 259 of gate 330. A second input 317 of gate 330 is derived from photocell 307 in FIGURE 26 through an amplifier 313. The amplifier inverts the photocell signal so that it conditions gate 330 when beam 407 is interrupted.

A single shot 331 is actuated by the output of AND gate 330 whenever its inputs simultaneously are conditioned by a load signal and an interruption of beam 407. The actuation of single shot 331 determines when the pneumatic backpulsing begins for a belt about to enter chamber 11. The output of a single shot 331 is inverted by circuit 332 and conditions AND gates 334 and 335. Because of inverter 332 (which may be eliminated by taking the complementary output from single shot 331), gates 334 and 335 are normally conditioned by the output of single shot 331 when it is not actuated. Thus gates 334 and 335 are deactivated during the actuation of single shot 331.

FIGURES 24A–E show the operation of FIGURE 22 circuitry. Thus in FIGURE 24A the control status is shown in the same manner as represented by FIGURE 20A. FIGURE 24B represents the output of amplifier 313 in response to the interruption of beam 407. FIGURE 24C represents the actuation of single shot 331 in response to the interruption of beam 407. FIGURE 24C represents the actuation of single shot 331 in response to the coincidence of a load condition and interruption of photocell beam 407 by a belt. The result of the operation of AND gates 334 and 335 is to reverse the positions of valves $V_5$ and $V_6$ before they would be reversed at time $t_b$ represented in FIGURE 20. Thus the valves are reversed shortly after the belt reaches the photocell in the manner represented at time $t_d$ in FIGURES 24D and E. The duration of the actuation of single shot 331, therefore, should include the period of belt travel from the photocell into chamber 11.

FIGURE 23 provides logic for controlling valves $V_2$ and $V_3$ in order to obtain pneumatic backpulsing as a belt is being moved into its assigned pocket. As explained above, the belt unload movement to a pocket is controlled by the unload signal on lead 250 in FIGURE 21, which resets each of the select triggers 224, 225, etc. The complementary select rigger outputs 228, 229, etc. are provided as inputs to an OR circuit 239 in FIGURE 23. A single shot 340 is actuated by the output of OR circuit 239. An inverter 341 provides the complementary output of single shot 340 for conditioning an AND gate 342.

Furthermore, a pair of inverters 360 and 361 also provide conditioning inputs to gate 342. Inverter 360 receives the output of amplifier 311 from photocell 301; and the inverter 361 receives the output of 312 from photocell 302. Because of inverters 360 and 361, the photocells decondition gate 342 when their light beam 401 or 402 is interrupted, and condition gate 342 when their light beams are not interrupted.

A single shot 343 is activated upon the total conditioning of gate 342.

Valve driving AND gates 352, 353, and 354 are respectively conditioned by the output of single shot 343, since gates 353 and 354 receive a direct output and gate 352 receives an inverted output (via inverter 351) from a single shot 343. Other respective inputs to gates 352, 353, and 354 are derived from leads 259, 253, and 240 from FIGURE 21. Valves $V_3$, $V_2$ and $V_{12}$ are controlled by the outputs of gates 352, 353 and 354 with the intervention of power amplifiers when necessary.

FIGURE 25A illustrates the load-unload status in the same manner as FIGURE 20A, except that FIGURE 25A is inverted. It is assumed that belt is to be unloaded from chamber 11 to a pocket connected to header section 16*b*, so that photocell beam 402 will not be interrupted during this unload operation. FIGURE 25B illustrates the non-interrupted output from photocell 301 which provides a continuous enabling input to gate 342 via inverter 360. The unload status is derived from the complementary outputs 228, 229, etc. from the select triggers in FIGURE 21 which are provided as inputs to an OR gate 229 in FIGURE 23. Accordingly, single shot 340 is actuated by the initiation of the unload status caused by an input on lead 250 in FIGURE 21, so that the output of inverter 341 then deconditions gate 342 since single shot 340 is then actuated. FIGURE 25C represents the output of inverter 341 in response to actuation by single shot 340 by the unload status.

In response to the unload status, a belt is moved from chamber 11 along the header sections 16*a* and 16*b* toward an assigned pocket, such as 42.

The output of photocell 302 (via amplifier 312 and inverter 361) conditions gate 342 when photocell beam 402 is not interrupted. Accordingly, the interruption of beam 402 deactivates AND gate 342.

Thus when a device receives an unload signal and the belt begins moving from chamber 11, gate 342 is initially disabled by the unload status timeout of single shot 340 (FIGURE 25C) which timeout should expire after the belt has interrupted beam 402 (FIGURE 25D). While beam 402 is interrupted, inverter 361 is deactivating gate 342 (FIGURE 25E). As soon as beam 402 is restored as the belt enters its assigned pocket, single shot 343 is actuated to start the backpulsing operation (FIGURE 25F).

The pneumatic backpulsing operation comprises opening chamber valve $V_3$ to apply low-pressure source $P_1$ and closing valves $V_{12}$ and $V_2$ to block high-pressure source $P_2$. The operation of valves $V_3$, $V_2$ and $V_{12}$ are represented by FIGURES 25G and H, respectively. Thus source $P_2$ is shut off to the trailing end of the belt by the activation of single shot 343, and source $P_1$ in the chamber is applied to the trailing end of the belt in order to obtain the backpulsing operation on the trailing edge of the belt as it has entered its assigned pocket.

The pneumatic backpulsing can stop the belt and hold it at a particular location, or the backpulsing can merely slow down the belt, depending on the duration of the backpulsing operation. In any case, the backpulsing assures the extension of the belt by applying a lower pressure at both of its ends than the pressure internal to the belt, that counteracting any situation then existing which may tend to cause belt collapse.

The circuits shown in FIGURES 22 and 23 can be used for forward pulsing instead of backpulsing.

In FIGURE 22, forward pulsing can be obtained by having the output of amplifier 336 or 337 connect to valve $V_2$ through an OR circuit 360 (instead of or in addition to $V_5$, $V_6$, $V_7$ and $V_8$), so that $V_2$ applies a high pressure pulse during the period of single-shot 331 to momentarily apply a higher pressure $P_2$ to the leading end of a belt being received into chamber 11.

Similarly in FIGURE 23, forward pulsing can be obtained by having the valves $V_5$ and $V_6$ or $V_7$ and $V_8$ connected oppositely in series with gate 352 (in addition to $V_3$) for momentary reversal by a single shot 343. In this case, the pulsing of single shot 343 shuts off $P_1$ valve $V_5$ (or $V_7$) and opens $P_2$ valve $V_6$ (or $V_8$) to momentarily slow down ar stop the belt in its pocket. After the pulsing, the low pressure from valve $V_5$ (or $V_7$) is restored to maintain the belt in the pocket. The output of gate 352 is applied to each gate 362 and 363, which is respectively actuated by line 226 or 227 according to which belt select trigger 224, 225, etc. is set.

While the invention has been particularly shown and described with reference to preferred embodiments thereof, it will be understood by those skilled in the art that the foregoing and other changes in form and details may be made therein without departing from the spirit and scope of the invention.

We claim:

1. Means for maintaining the extension of an endless belt being transported, comprising a header for transporting said entire belt under pneumatic actuation, means for providing a differential pressure between leading and trailing ends of the endless belt to move it along said header in the direction of the lower pressure side of said differential pressure, and pressure control means for lowering the differential pressure on the endless belt to insure an extended form of said endless belt.

2. Means for maintaining the extension of an endless belt as it begins to leave a header in which it is being transported by a differential pneumatic pressure comprising, means for sensing the position of said endless belt as it leaves said header, and pneumatic means for lowering the pressure differential across said endless belt in response to said sensing means to momentarily extend the leading edge of said belt relative to the trailing edge of the endless belt to assure the reliability of its elongation.

3. Means as defined in claim 2 in which said sensing means comprises, a photo-cell light beam arrangement.

4. Means as defined in claim 2 in which, a chamber is pneumatically connected to said header, and said sensing means being located in said header adjacent said chamber, and belt inflation means being actuated by said sensing means as said belt is momentarily slowed to enter said chamber, whereby belt elongation and inflation occur as said belt is moving from said header into said chamber.

5. Means as defined in claim 4 further comprising, pneumatic switching means coupled to said header on the opposite side of said endless belt from said chamber, a low pressure source connected to said pneumatic switching means, and means for actuating said pneumatic switching means in response to actuation of said sensing means by said endless belt.

6. Means as defined in claim 4 further comprising, a storage pocket pneumatically coupled to said header, and a pneumatic valve connected between said pocket and a low pressure source to assist pulsing the differential pressure across said belt.

7. Means as defined in claim 6 in which, a timing device is connected between said switching means and said valve to control its pneumatic actuation.

8. Means as defined in claim 2 in which, a storage pocket for said endless belt is pneumatically connected to said header, and said sensing means being located near an entrance to said pocket.

9. Means as defined in claim 8 further comprising, pneumatic switching means is coupled to said header on the opposite side of said endless belt from said chamber, a low pressure source connected to said pneumatic switching means, and means for actuating said pneumatic switching means in response to actuation of said sensing means by said endless belt for elongation of said belt.

10. Means as defined in claim 9 in which said pneumatic switching means comprises, a chamber pneumatically coupled to said header, and at least one pneumatic valve connected between said chamber and said low pressure source for being pulsed.

11. Means as defined in claim 9 in which, said sensing means includes a photo-cell beam along said header adjacent to an entrance of each pocket, means for sensing the restoration of said light beam to provide a signal while unloading said endless belt from said chamber, and means for actuating said pneumatic switching means in response to said signal.

12. Means for slowing or stopping an endless belt being transported, comprising means for providing a low differential pressure external to a leading end of the endless belt and a high differential pressure external to a trailing end of the endless belt to move it in the direction of the low pressure, and means for changing the low differential pressure to a high differential pressure on the leading end of the endless belt.

13. Means for slowing or stopping an endless belt as it leaves a header in which it is being transported by a differential pneumatic pressure comprising, means for sensing the position of said endless belt as it leaves said header, and means for increasing the pressure on the external side of the leading edge of said endless belt in response to said sensing means.

14. Means as defined in claim 13 in which said sensing means comprises, a photocell light beam arrangement.

15. Means for slowing or stopping an endless belt being transported, comprising means for providing a low differential pressure external to a leading end of the endless belt and a high differential pressure external to a trailing end of the endless belt to move it in the direction of the low pressure, means for maintaining the internal pressure of said belt greater than the pressure at either end of said endless belt, and means for at least momentarily equalizing the differential pressures external to the trailing and leading ends of said endless belt to slow down or stop said belt without collapsing it.

References Cited by the Examiner

UNITED STATES PATENTS

| | | | |
|---|---|---|---|
| 2,831,678 | 4/1958 | MacNeill | 226—50 |
| 2,954,911 | 10/1960 | Baumeister | 226—50 X |
| 3,184,131 | 5/1965 | Fieldgate | 226—97 |

M. HENSON WOOD, Jr., *Primary Examiner.*

R. A. SCHACHER, *Assistant Examiner.*